United States Patent [19]

Grodevant

[11] Patent Number: 5,692,203
[45] Date of Patent: Nov. 25, 1997

[54] POWER UP/POWER DOWN FOR ELECTRONIC HARDWARE WHICH CONSERVES ELECTRIC POWER

[75] Inventor: Scott Grodevant, Hilton, N.Y.

[73] Assignee: PSC, Inc., Webster, N.Y.

[21] Appl. No.: 605,808

[22] Filed: Feb. 23, 1996

Related U.S. Application Data

[63] Continuation of Ser. No. 482,957, Jun. 15, 1995, abandoned, which is a continuation of Ser. No. 295,175, Aug. 23, 1994, abandoned, which is a continuation of Ser. No. 30,530, Mar. 12, 1993, abandoned.

[51] Int. Cl.⁶ .................................................. G06F 1/32
[52] U.S. Cl. ............................................ 395/750; 364/707
[58] Field of Search .................................. 395/750, 550, 395/560; 364/707

[56] References Cited

U.S. PATENT DOCUMENTS

| | | | |
|---|---|---|---|
| 4,115,705 | 9/1978 | McElroy | 307/140 |
| 4,544,924 | 10/1985 | French | 340/825.69 |
| 4,598,383 | 7/1986 | Leach | 395/750 |
| 4,685,023 | 8/1987 | Heaston | 361/88 |
| 4,694,393 | 9/1987 | Hirano et al. | 395/750 |
| 4,768,162 | 8/1988 | Nishimura | 395/750 |
| 4,851,987 | 7/1989 | Day | 395/550 |
| 5,249,298 | 9/1993 | Bolan et al. | 395/750 |
| 5,270,946 | 12/1993 | Shibasaki et al. | 395/750 |
| 5,355,503 | 10/1994 | Soffel et al. | 395/750 |

Primary Examiner—Glenn A. Auve
Attorney, Agent, or Firm—Joseph F. Murphy

[57] ABSTRACT

A system especially suited for powering up and down electronic equipment operated to a power conservation mode, which conserves more power than other power conservation efforts. The system is operated by hitting any key of a keyboard which provides data entry signals via a plurality of data lines. An embodiment disclosed provides a flip-flop having power on and power off outputs and also inputs which change the flip-flop between set and reset states. A first isolation switch connects at least one of the plurality of keyboard data lines to the flip-flop for conditioning the flip-flop into the one of its set and reset states which provides power on output when serial data is provided, as when any key of the keyboard is pressed. A second isolation switch had data entry signals transmitted through it, and is switched by one of the outputs of the flip-flop so that data entry signals are prevented from being transmitted therethrough except when the flip-flop is in the one of its set and reset states which provides power on output when any key of the keyboard is pressed. The system may be continuously operated by direct connection to a power source, and may have equipment to be powered up and down connected to said power source via a power supply which supply is switched on and off by the power on and power off outputs, respectively, of the flip flop. The flip-flop may be conditioned into the one of its set and reset states which provides power off output via a sleep signal provided as an input via a sleep signal line.

12 Claims, 3 Drawing Sheets

S5 PRESSED

SAMPLE TIMING FOR S5 DEPRESSED.

5,692,203

POWER UP/POWER DOWN FOR ELECTRONIC HARDWARE WHICH CONSERVES ELECTRIC POWER

This application is a continuation of application Ser. No. 08/482,957, filed Jun. 15, 1995, which is a continuation of application Ser. No. 08/295,175, filed Aug. 23, 1994, now abandoned, which is a continuation of application Ser. No. 08/030,530 filed Mar. 12, 1993, now abandoned.

FIELD OF THE INVENTION

The present invention is in the field of power conservation and electrical device protection circuitry and is especially suited for powering up and down electronic equipment operated to a power-conservation mode between times when the equipment is powered down and then powered up.

BACKGROUND

To increase usable battery life, much electronic hardware incorporates a power-conserving "sleep" circuit which, after a preset time, will automatically "time-out" and put to SLEEP certain circuits, including especially the microprocessor circuits, thereby extending battery life. Such hardware necessarily includes "wake up" circuitry which will, upon manual activation, bring the hardware out of its power-conserving sleep mode.

Currently existing power conservation "sleep" circuits have two disadvantages. First, their sleep mode does not significantly conserve power, as it merely reduces internal power consumption of the microprocessor, and leaves all associated external circuitry drawing power. Second, typical wake up circuits require special hardware which must be operated periodically, after each automatic sleep time, before the hardware may be again used in normal operation. This resultant need for repeated manual wake-up interferes with use of the device, especially when an operator is unaware that the hardware has automatically entered the sleep mode and starts to enter data, only to find that the hardware is not responding, but requires a press of the "wake up" switch.

To overcome the foregoing disadvantages, it is desirable and advantageous to implement a power conservation circuit which (1) Conserves more power in its power conservation mode, termed POWER DOWN state, than does common sleep mode, by reducing power to nearly all circuit components not just to the microprocessor and which (2) Is removed from power conservation mode, and restored to operational mode (termed POWER UP state) by using existing hardware such as that provided for data entry, so that an operator attempting to begin operation of the hardware while it is in POWER DOWN state will thereby automatically POWER UP the hardware, immediately permitting ordinary hardware operation.

An ideal solution to the problem would allow POWER UP to be initiated by the keyboard in a 'hit-any-key' fashion with which operators are already familiar for software screen wakeup. This would seem to entail operatively connecting the keyboard to the power supply which must be POWERED UP, as well as to the microprocessor inputs to which it is normally connected. However, these keyboard-to-power supply and keyboard-to-microprocessor input connections can connect the power supply to the microprocessor inputs—thus risking destruction of the microprocessor. Thus, it has heretofore been thought that keyboard keys could not be used to initiate POWER UP.

SUMMARY OF THE INVENTION

The present invention provides a method of, and apparatus for establishing and inhibiting electronic equipment operation by applying (connecting) or removing (disconnecting) a source of power, especially a battery, and which implements a power conservation mode in a power down state in which most components are deenergized, and hence less power is consumed than in prior art "sleep" modes, while the circuit is still capable of being restored to its ordinary ("POWER UP") mode of operation. The circuit uses data entry keys, connected to the input means of a microprocessor, which operate in conjunction with isolation switches to allow the data entry keys to not only permit data entry but also to switch power to the microprocessor and other circuit components, without allowing power to appear at the input of the microprocessor. More specifically, in a preferred embodiment, the present invention permits initiating POWER UP with an existing data entry keyboard having its keys connected to both the microprocessor inputs and to the power supply, yet while ensuring that the microprocessor inputs are never electrically connected to the power supply. The method and apparatus is especially suited for an automatic powerdown and a "hit-any-key" powerup function.

OBJECTS OF THE INVENTION

1) To provide an improved system having an automatic power conservation mode which conserves power better than the common microprocessor sleep mode.

2) To provide an improved system in which a circuit in a power down state is restored to its power up state so as to conserve power when not operational.

3) To implement the system which obtains the foregoing objects with a keyboard in a hit-any-key wake up/power up fashion.

DETAILED DESCRIPTION

Figure 1:
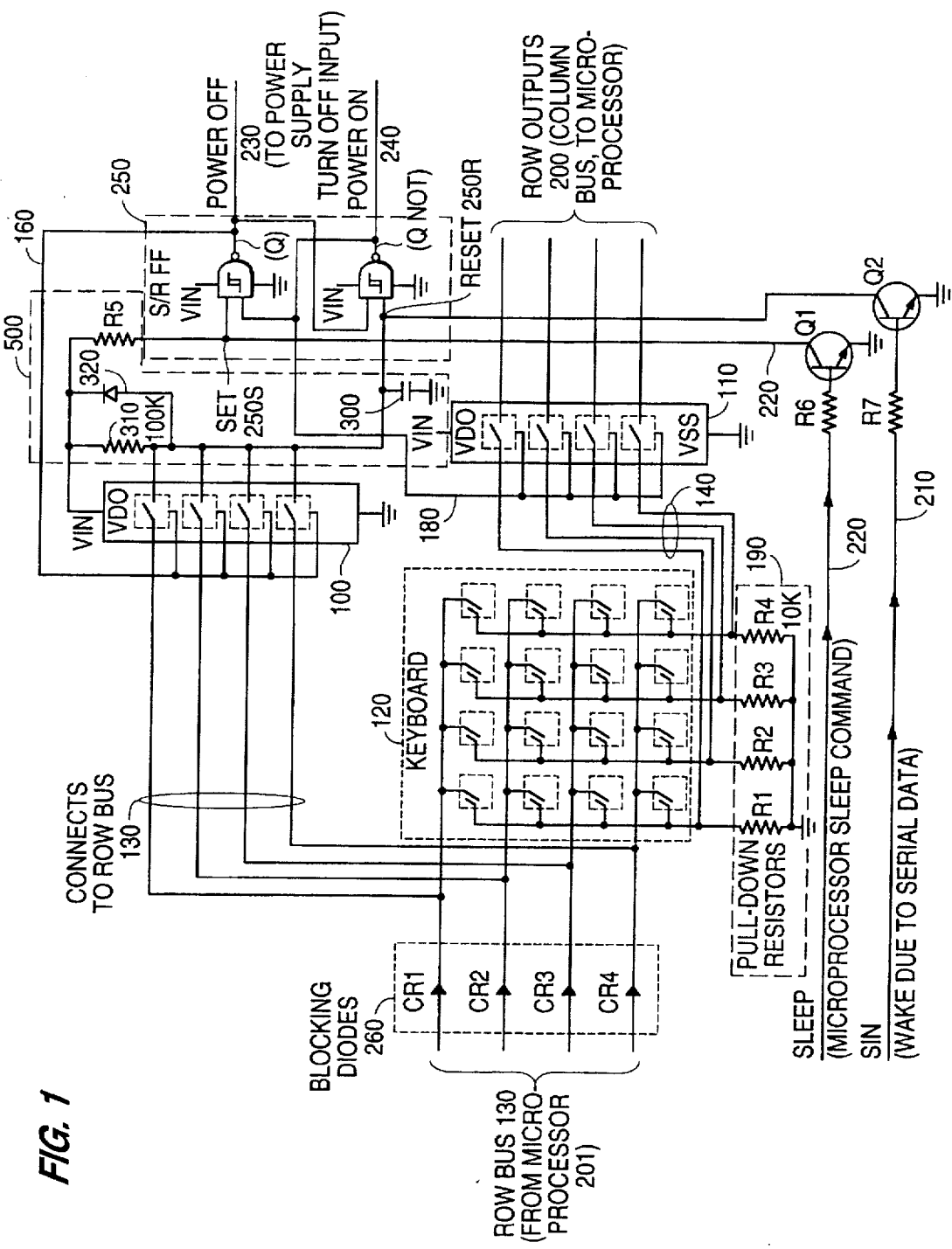
FIG. 1 is a schematic diagram of a circuit of a preferred embodiment of the present invention.

In FIG. 1, a standard row-column output keypad 120 (an exemplary data entry device, sometimes part of a terminal) has a row bus 130 and a column bus 140. The buses 130 and 140 are connected to isolating switches 100 & 110. These switches may be IC chips such as one or more quad bilateral switches sold by National Semiconductor (the type CD4066BC), which combine four switches in open chip, in a bilateral implementation. Switches 100 and 110 are continuously powered as from a battery (not shown) connected to power terminals $V_{in}$ thereof. Each data line of the row bus 130 is switched by a separate switch of first isolation switch 100. The switches are jointly connected to a common first trigger line 160. In similar fashion, each data line of said column bus 140 is switched via a separate switch of a second isolation switch 110. The switches of the switch 110 are jointly connected to a common second trigger line 180. Each column bus has, ahead of the isolation switch 110, a separate pull-down resistor R1, R2, R3, R4 of a set of pull down resistors 190 connecting it to ground.

A "Power Flip-Flop" 250 (hereinafter referred to as FF) of the Set-Reset (S/R) type is provided. The FF inputs are active low, that is to say that a low level on a FF input causes the FF output to change to that state. The FF can be implemented using a S/R FF logic element or, in the preferred embodiment, is constructed using cross-connected NAND gates, as shown.

This FF 250 has two inputs: SET input 250S, driven by a POWER DOWN signal transmission line 220 and RESET input 250R, driven by POWER UP signal transmission means 210.

Flip-Flop 250 has two standard outputs: Q, which is denoted as the POWER DOWN status signal line 230 and which is connected to the switch first trigger line 160, and Q-NOT, which functions as the POWER UP status signal on line 240 and which is connected to switch first trigger line 180.

Note that each of the two FF outputs is connected to a separate one of the two trigger lines. Since only one of the two FF outputs is active at a time, only one of the isolation switches 100 and 110 is triggered at a time. In other words, only one of the two switches—but never both—are ever active at a time.

A circuit 500 "bootstraps" the system upon initial power application, by providing an initial on signal to on input 250R. In a preferred embodiment, the bootstrapping circuitry comprises a capacitor 300 connected between ground and input 250R. Associated with capacitor 300, and forming an RC time constant therewith, is resistor 310, which itself is placed between Vin and on input 250R. Resistor 310 has parallel to it a diode 320, which provides a discharge path for capacitor 300. This bootstrapping circuit initializes the system to the Power Up state when $V_{in}$ is applied. In this regard, note that bootstrap turn on occurs when power is initially turned on to a device. At this time the RC time constant due to resistor 310 and capacitor 300, provides the initial on signal to FF input 250R resetting the FF 250, which, as will be explained below, puts the circuit in POWER UP mode. The signals usable as POWER UP comprise not only the bootstrap signal but key contact signals or serial data such as raw serial data, RS232 data, or data in accordance with other protocols.

Figure 2:
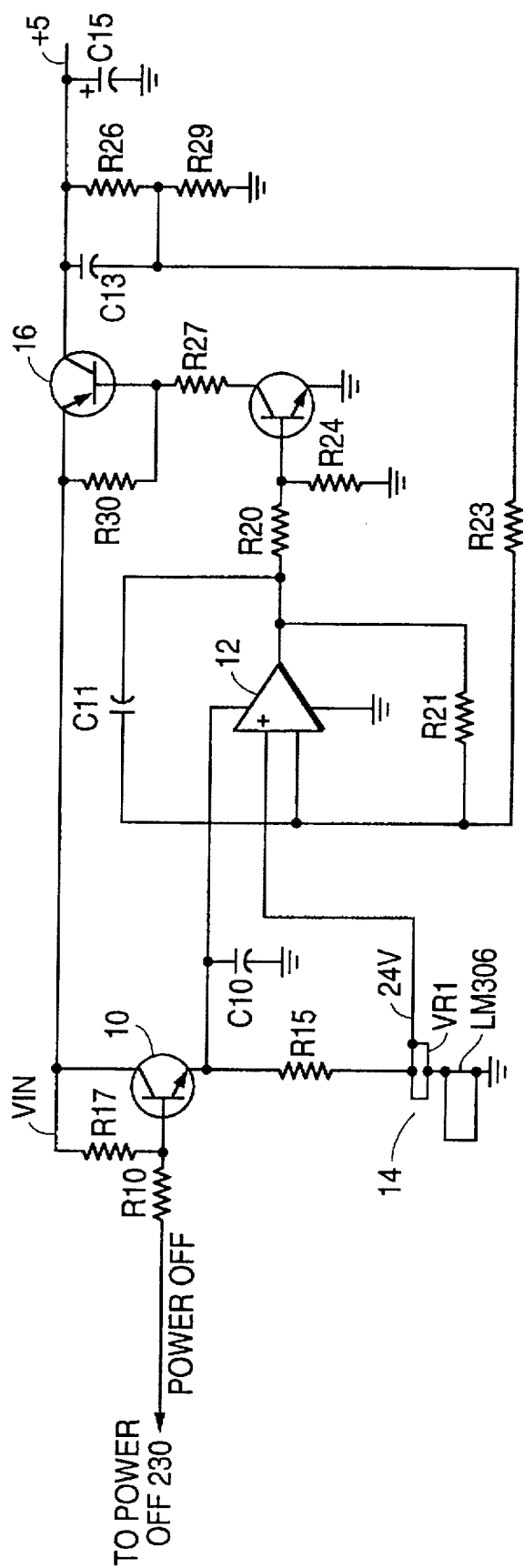
FIG. 2 shows a typical power supply controlled by the circuit of FIG. 1.

FIG. 2 shows the typical power supply which is controlled by the system of FIG. 1. A transistor 10 acts as a switch which supplies an op-amp 12 and a Zener voltage reference 14 with power. When the power FF 250 is in its POWER DOWN state, power is removed from these components. As the op-amp is then powered, the base drive for transistor 16, the power supply's "pass" element, is off, so no power can flow from Vin to +5 output terminal of the supply of FIG. 2. This +5 output terminal provides operating power for all associated external circuits, such as the ROMS, RAMS, PALS, and even the microprocessor.

The operation of the circuit of FIGS. 1 and 2 may be better understood by reference to the following discussion.

After a (pre-programmed) time, in which powered hardware has not received any operator input, the microprocessor (connected to line 220) deems it is time to go to "sleep", and initiates its internal sleep function, in order to reduce microprocessor power consumption. In order that the power consumption of the microprocessor's external associated circuitry, such as decoders, ROM, RAM, PAL, etc. (not pictured) is reduced when the microprocessor sleep mode becomes effective, the microprocessor's sleep signal appears on line 220 as the POWER DOWN input to FF input 250S, the SET input of Set/Reset (S/R) FF 250. This "sets" the FF 250, thus sending the Q output, which provides the POWER DOWN output status indicator, a high level indicating a POWER DOWN condition. The various logic states are indicated in the following table.

| Circuit State | Q | Q-NOT | 250S | 250R |
|---|---|---|---|---|
| Power OFF | 1 | 0 | 1 | 1 |
| Bootstrap | 0 | 1 | 1 | 0 |
| Key wakeup | 0 | 1 | 1 | 0 |
| Serial data wakeup | 0 | 1 | 1 | 0 |
| Sleep command | 1 | 0 | 0 | 1 |

(Notes on Table: Bootstrap: Once capacitor 300 charges the 250R input returns HI (high logic level); Key wakeup: Once the key is released the 250R input returns HI; Serial data wakeup: Once serial data returns to its normal state the 250R input returns HI; Sleep command: Once the power is removed from the microprocessor this input returns HI; Of course, the Sleep signal could be provided by means other than a microprocessor, e.g., by any source of logic level voltage.)

As is seen by reference to FIG. 2, the POWER DOWN signal at 230 now turns off transistor 10, which acts as a switch supplying power to the op-amp 12 and voltage reference 14, thereby cutting off power. As the op-amp 12 is now not powered, the base drive for transistor 16 is eliminated, the power supply's 'pass' element is turned off, so no power can flow from Vin to +5 terminal.

Thus greatly reduced power consumption over conventional sleep mode, has been achieved, as the power to everything is cut (POWER DOWN), with the exception of the power to Flip-Flop 250 and the isolation switches (and, of course, any other circuitry, such as volatile memory, which a designer may provide and may wish to be continuously powered). As the power Flip-Flop 250 typically draws only one hundred microamperes of current, this provides great savings in current consumption over built-in microprocessor sleep modes.

During POWER DOWN state, the keyboard is effectively disconnected from the microprocessor in the following manner: FF 250 Q-NOT output, on line 240, is low. This low is presented to the trigger line 180, thereby disconnecting all lines of column bus 140 from the microprocessor inputs at 200, and effectively disconnecting the keyboard from the microprocessor.

This keyboard-microprocessor disconnection prevents the undesirable power supply-keyboard-microprocessor circuit from being completed, thereby protecting the microprocessor by preventing voltage from appearing at its inputs. These logic states are also shown in the table.

While the column bus lines 140 are being disconnected, the row data bus lines 130 are being connected to POWER UP input 250R via the first isolation switch 100 (triggered by POWER DOWN output status line 230). Since no key is being depressed at this time, the row lines terminate at the row contacts in keyboard 120; thus, no signal is being sent to POWER ON input 250R. The logic states at this time are also shown in the Table.

However, pressing any key will connect the row lines, complete a circuit and send a signal to POWER ON input 250 R, thus initiating POWER UP. Each line of the column bus 140 is connected both to ground, through one of the pull-down resistors 190, and also connected to corresponding microprocessor inputs (not shown for reasons of clarity). Each line of the row bus 130 is connected solely to the microprocessor strobe output shown at 201.

Figure 3A:
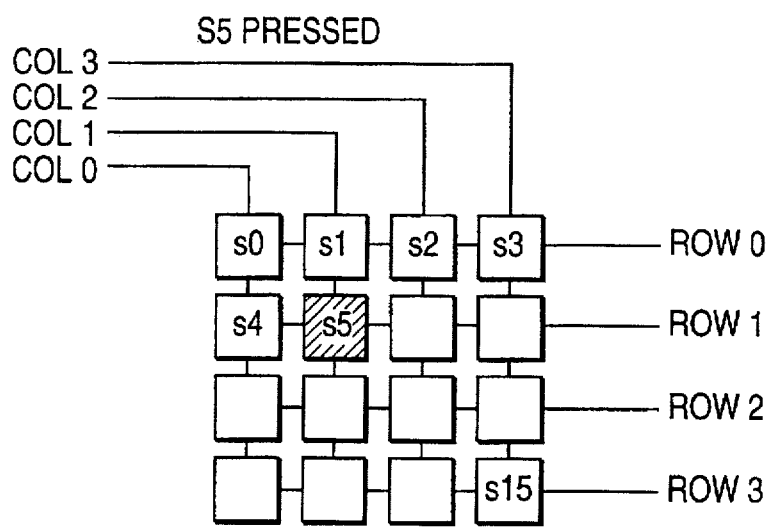
FIG. 3A shows an exemplary keystoke with S5 being pressed.
Figure 3B:
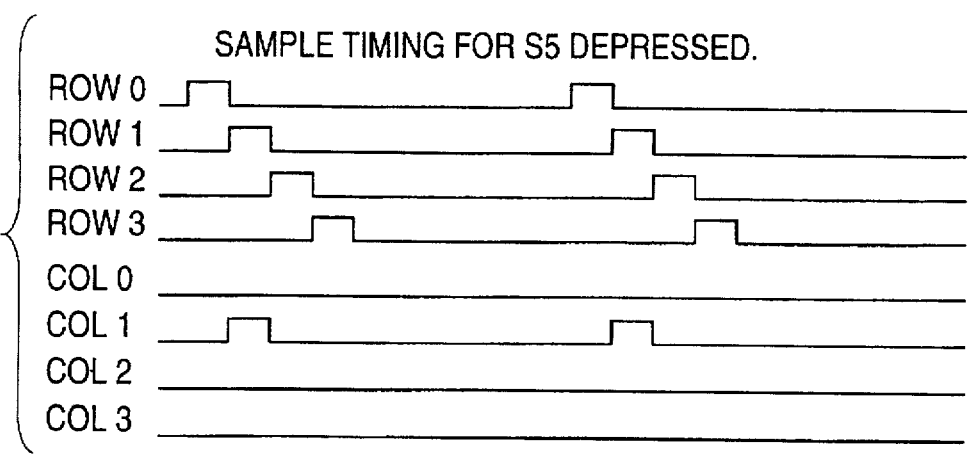
FIG. 3B is a timing diagram showing the states of row and column lines of the keypad shown in FIG. 1 for the exemplary key stroke.

To sense key pressings during ordinary data input operations, successive strobe pulses are periodically applied, repeatedly, in sequence, to each row bus line. This is illustrated in FIG. 3B, which show the signals used to detect an exemplary keypress at row 1, column 1 (key s5 in FIG. 3A). If no key is being depressed, the row bus line is connected to a column bus line, and then to a microprocessor input, and the keyboard does not sense any signal level change from its non-depressed state (low logic level). When a key is depressed, the keyboard control circuitry which senses the columns detects a high logic level at the intersection of the sensed column and the strobed row line; this intersection is of course the location of the key which has been depressed.

"Disconnection" here means a disconnection of one of the data buses, e.g. to a disconnection of the column bus, at a point between the column pull down resistors and the microprocessor inputs, by isolation switch 110, or to a disconnection of the row bus lines from FF set input 250R. Furthermore, the row signals are effectively disconnected from the row outputs 200 by the action of the blocking diodes 260. These blocking diodes prevent the wake-up voltage (present on the row signals) from reaching the microprocessor.

Consider next operation on POWER UP: When the keyboard is in disconnected condition, a signal generating circuit similar to the one used to generate keyboard data signals may be formed from the key contacts. The column bus lines are connected to ground through the pull down resistors 190 and are also connected to the row lines via the column contact/row contact provided by the keys. When any single key, or multiple keys, is (are) pressed such as if an operator were attempting to resume data entry, the key contact completes a circuit consisting of pull up resistor 310, and one (or more) of the pull down resistors 190, thus forming a voltage divider. The voltage divider output voltage is selected by the sizes of resistors 190 and 310 to be a logic low level as seen by the 250R FF input. This low level is applied to FF 250R input and causes the FF 250 to clear. Thus, its POWER UP status line 240 high is inputted to the power supply. This restores power to the microprocessor and support circuitry—thereby returning the system to its normal operating mode. i.e., POWER UP condition.

In complementary fashion with the POWER UP signal's restoring power to the circuit, the POWER DOWN signal at 230 goes low, and opens first isolation switch 100 via the trigger line 160. This disconnects the keyboard row bus from the FF 250R input. Thereafter, any subsequent key presses will no longer connect row lines to the FF, but will instead connect the contact of the row line and column line of the depressed key to microprocessor inputs at 200, which sense key contact location in the usual manner, thereby permitting ordinary operation and data input. See the table for logic states at this point; note that (250R=0) is a transient state until the operator releases the depressed key(s).

Thus, while it is true that the same key was indeed connected to both the microprocessor and to the power supply, with one contact of the key connected to the microprocessor and the other contact connected to the power supply, microprocessor and the power supply are alternately disconnected simultaneously connected to opposing key contacts—and hence though the same key is used, no direct connection is possible. Thus, the same key can be used to switch both power and input data, an important feature of the invention, and thus, the second objective has been achieved.

Variations and modifications within the scope of the invention will be apparent to those skilled in the art. For example, rather than a voltage regulator power supply which is connected to a battery (Vin), as shown in FIG. 2, other AC/DC and DC/DC converter supplies powering other equipment, or, indeed, other equipment itself, may be used as that which is to be powered down. Other circuits may be used to handle transistors operated at different voltage levels. Furthermore, rather than a key press signal provided via the isolation switch to FF 250, one serial data source, or even several wire-ORed or multiplexed serial data sources, could be used to provide the POWER UP signal to power up input 250R. Usable signals include: sound (from an amplified microphone), light (from a phototransistor), mechanical orientation (from a mercury switch), to name but a few non-limiting examples for the purpose of illustration. Accordingly the foregoing description should be taken in an illustrative sense and not in a limiting sense.

I claim:

1. A system for changing a state of electronic equipment which is operated from a power source from a power down state to a power up state by operation of any key of a keyboard which provides data entry signals via a plurality of data lines, said system comprising:

a power flip-flop which has a power on output and a power off output and inputs which change the flip-flop between set and reset states, a first isolation switch connected to said flip-flop and connecting at least one of said keyboard data lines to said flip-flop for conditioning said flip-flop into one of the set and reset states which provides the power on output when any key of said keyboard is actuated, and a second isolation switch through which said data entry signals are transmitted, and one of said outputs from said flip-flop being connected to said second isolation switch for opening said second isolation switch to prevent said data entry signals from being transmitted except when said flip-flop is in said one of the set and reset states, wherein said system is continuously operated by direct connection to said power source, wherein said equipment is operated from said power source via a power supply which interconnects said power source and said equipment, wherein said power supply is switchable between an on state and an off state, and said power supply is in said on state when said power on output is asserted, and said power supply is in said off state when said power off output is asserted, and wherein said system further includes a sleep signal line input to said flip-flop for conditioning said flip-flop into the one of the set and reset states which provides said power off output when a sleep signal is provided on said sleep signal line.

2. A system for changing a state of electronic equipment which is operated from a power source from a power down state to a power up state by operation of any key of a keyboard which provides data entry signals via a plurality of data lines, said system comprising:

a power flip-flop which has a power on output and a power off output and inputs which change the flip-flop between set and reset states, a first isolation switch connected to said flip-flop for conditioning said flip-flop into the one of the set and reset states which provides the power on output when any key of said keyboard is actuated, and a second isolation switch through which said data entry signals are transmitted, and one of said outputs from said flip-flop being connected to said second isolation switch for opening said second isolation switch to prevent said data entry signals from being transmitted except when said flip-flop is in said one of the set and reset states, wherein said system is continuously operated by direct connection to said power source, wherein said equipment is operated from said power source via a power supply which interconnects said power source and said equipment, wherein said power supply is switchable between an on state and an off state, and said power supply is in said on state when said power on output is asserted, and said power supply is in said off state when said power off output is asserted, and wherein said system further includes a serial data line input to said flip-flop for conditioning said flip-flop into the one of the set and reset states which provides said power on output when serial data is provided on said serial data line.

3. The system of claim 2 wherein said serial data line is connected to a bootstrap circuit which generates serial data in the form of an impulse upon said power source being connected to said system.

4. A system for changing a state of electronic equipment which is operated from a power source from a power down state to a power up state by operation of any key of a keyboard which provides data entry signals via a plurality of data lines, said system comprising:

a power flip-flop which has a power on output and a power off output and inputs which change the flip-flop between set and reset states, a first isolation switch connected to said flip-flop for conditioning said flip-flop into the one of the set and reset states which provides the power on output when any key of said keyboard is actuated, and a second isolation switch through which said data entry signals are transmitted, and one of said outputs from said flip-flop being connected to said second isolation switch for opening said second isolation switch to prevent said data entry signals from being transmitted except when said flip-flop is in said one of the set and reset states, wherein said data entry signals comprise strobe signals, said strobe signals being periodically present on at least one of said plurality of data lines, and said first isolation switch connecting said keyboard data lines to said flip-flop for conditioning said flip-flop into the one of the set and reset states which provides said power on output when any key on said keyboard is actuated.

5. The system of claim 4 wherein said first isolation switch is switched via a first trigger line connected to said power off output, and wherein said second isolation switch is switched via a second trigger line connected to said power on output.

6. A system for changing a state of electronic equipment, which is operated from a power source, from a power down state to a power up state by operation of any key of a keyboard which provides data entry signals to data utilization equipment via a plurality of data lines, said system comprising:

a microprocessor having inputs for sensing signals, a power flip-flop which has a power on output and a power off output and inputs which change the flip-flop between set and reset states, a keypad in which a plurality of keys are disposed in an R×C matrix, where R and C are non-zero integers, said keypad consisting of R rows and C columns, said R rows being each connected to a corresponding one of R lines of a row data bus, and said C columns being each connected to a corresponding one of C lines of a column data bus, and said row data bus connects each of said R rows to a corresponding one of R outputs of a strobe signal generating means, and said column data bus connects each of said C columns to a corresponding one of C inputs of said data utilization equipment and said strobe signal generating means successively generates a signal one each of said R lines, and said inputs of said microprocessor continually sense signal levels of each of said C lines, so that depressing a key located in the Ith row and the Jth column causes said inputs of said microprocessor to sense a data entry signal at the Jth line when the Ith line is strobed, thereby decoding keypress information, said system further comprising:

a first isolation switch connected to said flip-flop and connecting said row data bus lines to said flip-flop for conditioning said flip-flop into the one of the set and reset states which provides said power on output when any key of said keyboard is actuated, and a second isolation switch, connecting said column data bus and said inputs of said microprocessor, and through which said data entry signals are transmitted, and one of said outputs from said flip-flop being connected to said second isolation switch for opening said second isolation switch to prevent said data entry signals from being transmitted except when said flip-flop is in said one of the set and reset states.

7. The system according to claim 6 wherein said system is continuously operated by direct connection to said power source and wherein said equipment is operated from said power source via a power supply which interconnects said power source and said equipment, and wherein said power supply is switchable between an on state and an off state, and said power supply is in said on state when said power on output is asserted, and said power supply is in said off state when said power off output is asserted.

8. The system of claim 7 wherein said system further includes a sleep signal line input to said flip-flop for conditioning said flip-flop into the one of the set and reset states which provides the power off output when a sleep signal is provided on said sleep signal line.

9. The system of claim 8 wherein said system further includes a serial data line input to said flip-flop for conditioning said flip-flop into the one of the set and reset states which provides the power on output when serial data is provided on said serial data line.

10. The system of claim 9 wherein said serial data line is connected to a bootstrap circuit which generates serial data in the form of an impulse upon said power source being connected to said system.

11. The system of claim 10 wherein said first isolation switch is switched via a first trigger line connected to said power off output, and wherein said second isolation switch is switched via a second trigger line connected to said power on output.

12. The system according to claim 6 wherein said data utilization equipment comprises said microprocessor and said strobe signal generating means comprises said microprocessor.

* * * * *